United States Patent [19]
Yasuda et al.

[11] Patent Number: 4,805,277
[45] Date of Patent: Feb. 21, 1989

[54] PROCESS FOR PRODUCING A GRID FOR USE IN LEAD ACID BATTERIES

[75] Inventors: Hiroshi Yasuda, Shizuoka; Sadao Furuya, Toyohashi; Naoto Hoshihara, Shizuoka; Takashi Yamaguchi, Kosai; Katsuhiro Takahashi, Toyohashi; Teruaki Ishii, Kosai, all of Japan

[73] Assignee: Matsushita Electric Industrial Co., Ltd., Osaka, Japan

[21] Appl. No.: 671,354

[22] Filed: Dec. 21, 1987

Related U.S. Application Data

[63] Continuation of Ser. No. 870,781, Jun. 5, 1986, abandoned.

[51] Int. Cl.$^4$ .............................................. H01M 4/74
[52] U.S. Cl. ........................................... 29/2; 429/242; 429/245
[58] Field of Search .................... 429/242, 245; 29/2

[56]  References Cited

U.S. PATENT DOCUMENTS

| | | | |
|---|---|---|---|
| 4,035,556 | 7/1977 | Duddy et al. | 429/245 |
| 4,107,407 | 8/1978 | Koch | 429/245 |
| 4,279,977 | 7/1981 | Matter | 429/245 |
| 4,443,918 | 4/1984 | Morinari et al. | 29/2 |

FOREIGN PATENT DOCUMENTS

| | | | |
|---|---|---|---|
| 2721560 | 11/1978 | Fed. Rep. of Germany | 429/242 |
| 0066868 | 5/1980 | Japan | 429/245 |
| 0167268 | 8/1985 | Japan | 29/2 |
| 0232668 | 11/1985 | Japan | 29/2 |

*Primary Examiner*—Donald L. Walton
*Attorney, Agent, or Firm*—Stevens, Davis, Miller & Mosher

[57]  ABSTRACT

The present invention provides a process for producing a grid for use in lead acid batteries which comprises superposing a sheet or a foil of a lead alloy on a sheet bar composed of a lead-calcium alloy, said sheet or foil of lead alloy having a composition different from that of the sheet bar and having a thickness smaller than that of the sheet bar, followed by integrating the two materials by cold rolling process to form an elementary sheet and then subjecting the elementary sheet to an expanding or punching processing.

The grid obtained according to this process is improved in the charging recovery characteristics after standing in a superdischarged state and in the corrosion resistance of grid at high temperatures without deteriorating the maintenance-free characteristics of the lead-calcium alloy itself.

10 Claims, 4 Drawing Sheets

F I G. 2
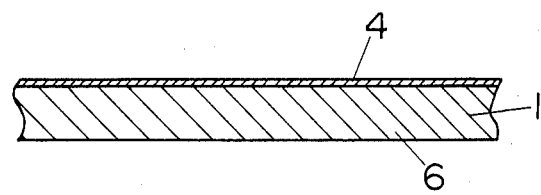
F I G. 3
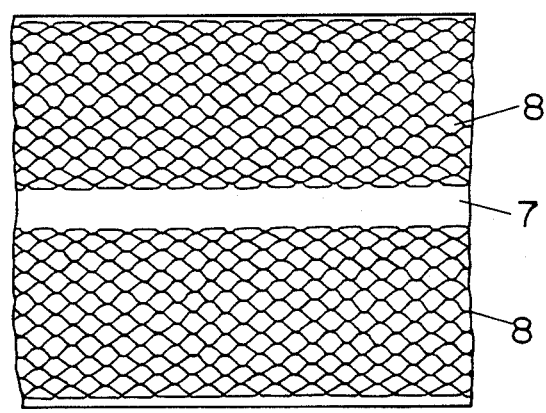

PROCESS FOR PRODUCING A GRID FOR USE IN LEAD ACID BATTERIES

This application is a continuation, division, of application Ser. No. 870,781, filed June 5, 1986 now abandoned.

BACKGROUND OF THE INVENTION

1. Technical Field of the Invention

The present invention relates to lead acid batteries for use as an electric source for automobiles and in other fields, and more particularly to a process for producing a grid for use in lead acid batteries.

2. Prior Art

Currently, there is an increasing tendency to use a lead-calcium alloy as the grid for lead acid batteries because of its excellent properties, i.e. a small loss in electrolytic solution after assemblage of battery and only a slight self-discharge during storage.

As compared with the lead-antimony alloy which has been used prior to lead-calcium alloy, however, the lead-calcium alloy is inferior in castability and mechanical strength after casting. For these reasons, it has hitherto been conventional to form a lead-calcium alloy into a grid by rolling its ingot into a sheet and then subjecting the sheet to an expanding treatment.

When an acid battery using a grid of lead-calcium alloy is left standing for a long period of time in a discharged state, a high resistance substance is formed at the interface between the positive electrode and the active material and this high resistance substance makes the next charging procedure impossible.

Accordingly, a first object of the present invention is to provide a process for producing a grid for use in lead acid batteries which solves the above-mentioned problem.

The second object of the present invention is to obtain a grid for use in lead acid batteries by a process which comprises superposing a sheet or a foil of a lead alloy on a sheet bar of a lead-calcium alloy, the lead alloy sheet or foil having a composition different from that of the sheet bar and having a thickness smaller than that of the sheet bar, followed by subjecting the superposed materials toa cold rolling to form an elementary sheet in which both the materials are integrated and then subjecting the elementary sheet to an expanding or punching process.

The third object of the present invention is to provide a grid for use in lead acid batteries which is easy to produce and low in cost.

Other objects of the present invention will become apparent from the examples of the invention described below.

SUMMARY OF THE INVENTION

According to the present invention, a grid is formed by superposing a sheet or a foil of a lead alloy on a sheet bar of a lead-calcium alloy, said sheet or foil having a composition different from that of the sheet bar and having a thickness different from that of the sheet bar, followed by subjecting the superposed materials to a cold rolling to integrate both the materials and to produce an elementary sheet having a thickness smaller than that of the sheet bar and then subjecting the elementary sheet thus obtained to an expanding process or a punching process.

In the process of the invention, a grid is produced from a plate or a sheet of which superficial tin concentration has been enhanced by the above-mentioned cladding process by cold rolling as an elementary material, by which the formation of a high resistance substance at the interface between the grid, made therefrom, and the active material can be prevented.

It has been found that the formation of the high resistance substance at the interface between the positive electrode grid and the active material filled therein can effectively be prevented by adjusting the quantity (content) of tin in the lead-calcium alloy to 1.5% by weight (hereinafter, simply referred to as "%"). However, tin is more expensive than lead as an elementary material, so that it is undesirable from the viewpoint of industrial mass production to add as large an amount as 1.5% or more of tin into the grid alloy because it makes the over-all cost of the grid alloy too high.

Thus, there have hitherto been devised various means for enhancing the concentration (content) of tin only in the interfacial part of grid making contact with active material. According to the present invention, a lead alloy sheet having a high tin content in its superficial part is produced by the so-called cladding process which comprises superposing a lead-tin alloy having a smaller thickness than that of sheet bar on a sheet bar of lead-calcium alloy and subjecting the superposed materials to a cold rolling. Generally speaking the, cladding process is effective for achieving a high bonding strength if combined with a heat treatment such as hot rolling process. The present inventors also found that a hot rolling process which comprises heating a sheet bar of lead alloy to a temperature higher than its recrystallization temperature, superposing a lead-tin alloy on the heated sheet bar and rolling the superposed materials is effective for enhancing the bonding strength between the two layers. However, there is a tendency that, according to this method, the lead sheet cannot exhibit a sufficient time-hardening effect so that tensile strength becomes low. In view of above, the present inventors have studied the optimum conditions of cladding on the premise that a sheet bar of lead alloy is subjected to cold rolling at a temperature not higher than the recrystallization temperature of the alloy. As the result, it has been found that a clad sheet having a bonding strength enough to endure the expanding process can be produced by making the thickness of the lead-tin alloy superposed on the sheet bar as small as 0.7 mm or less adjusting the rolling ratio (the ratio of thickness of elementary material before rolling to the thickness of rolled sheet) to a value of 5 or more. According to this process, a high sheet strength and a high bonding strength at the bonded surface can both be achieved simultaneously. Further, the procedure is so simple that a mere pressure bonding of different metals is enough for the purpose. Further the clad material has a high dimensional accuracy regarding thickness, and the process is accompanied with no material loss. The expanded grid obtained by this process has a predetermined thickness of a tin-rich layer containing a predetermined concentration of tin on its surface.

DESCRIPTION OF DRAWINGS

FIG. 2 is an enlarged sectional view of the sheet-formed elementary material.

FIG. 3 is a top view of the sheet-formed material having been subjected to an expanding process.

DESCRIPTION OF EXAMPLES

Hereunder, examples of the invention will be mentioned.

Figure 1:
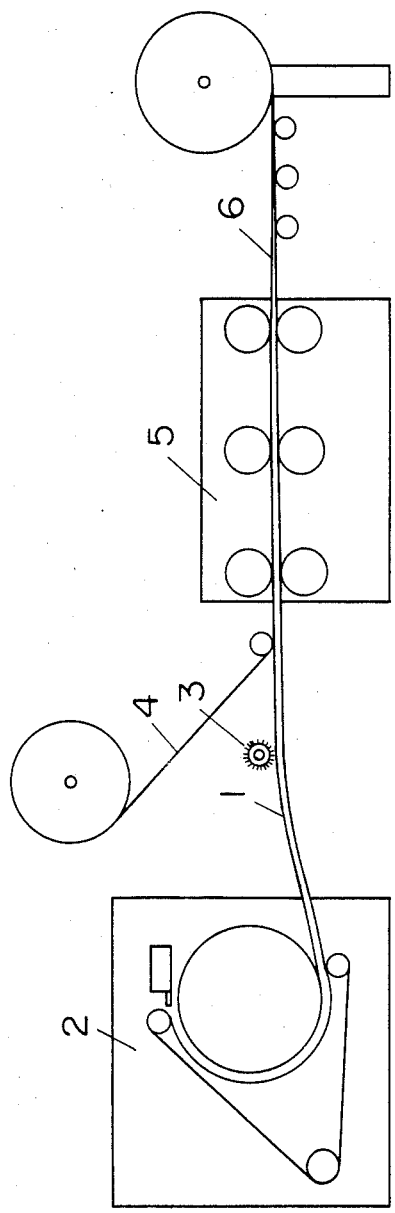
FIG. 1 is an schematic illustration of the process for producing the ribbon-like sheet-formed elementary material used for the production of the grid of the invention.

As shown in FIG. 1, a sheet bar of lead-calcium-tin alloy 1 was continuously formed into a ribbon by means of sheet bar caster 2. The sheet bar had a thickness of 10 mm and a width of 80 mm. As for the composition, lead-calcium-tin alloys containing 0.03-0.15% by weight of calcium and 0-1.5% by weight of tin are preferred. In the present experiment, a lead-calcium-tin alloy composed of 0.07% by weight of calcium, 0.25% of tin and a residual quantity of lead was used. At the outlet of sheet bar caster 2, the sheet bar 1 had a temperature of about 150° C. which was lower than the recrystallization temperature of the alloy. One surface of the ribbon-like sheet bar 1 was briefly ground with buff 3. Then, two sheets per one run of lead-tin alloy 4, having a thickness of 1.2, 1.0, 0.7, 0.5, 0.3 or 0.1 mm, having a width of 20 mm throughout all the runs and containing 5% by weight of tin throughout all the runs, were placed thereon in parallel with each other at an interval of 20 mm. Thereafter, the whole was passed through a continuous multi-stage rolling mill 5 equipped with three or more stages of rolls to prepare a lead alloy sheet 6 having he same width of 80 mm. FIG. 2 illustrates this rolled lead alloy sheet. The surface of the rolled sheet was constituted of a thin layer of lead-tin alloy pressure-bonded onto the lead-calcium-tin alloy layer. The final thicknesses of the sheets were 2.5, 2.25, 2.0, 1.75, 1.5, 1.25, 1.0 and 0.7 mm.

Each of the lead alloy sheets thus obtained was bent so that the lead-tin alloy came outside, and the state of peeling was investigated. The results were as shown in Table 1. In the runs where the thickness of lead-tin alloy sheet was 0.7mm or less and the rolling ratio was 5 or more, a good lead alloy sheet allowing no peeling of the lead-tin alloy sheet from sheet bar was obtained.

TABLE 1

| Thickness of final sheet (mm) | Rolling ratio | Bonding strengths Thickness of lead-tin alloy layer | | | | | |
|---|---|---|---|---|---|---|---|
| | | 0.1 mm | 0.3 mm | 0.5 mm | 0.7 mm | 1.0 mm | 1.2 mm |
| 0.7 | 14.4 | O | O | O | O | O | O |
| 1.0 | 10 | O | O | O | O | O | O |
| 1.25 | 8 | O | O | O | O | Δ | X |
| 1.5 | 6.7 | O | O | O | O | X | X |
| 1.75 | 5.7 | O | O | O | O | X | X |
| 2.0 | 5 | O | O | O | O | X | X |
| 2.25 | 4.44 | O | O | O | Δ | X | X |
| 2.5 | 4 | O | O | X | X | X | X |

Bonding strength
O: Good
Δ: Somewhat good
X: Not good

Figure 4:
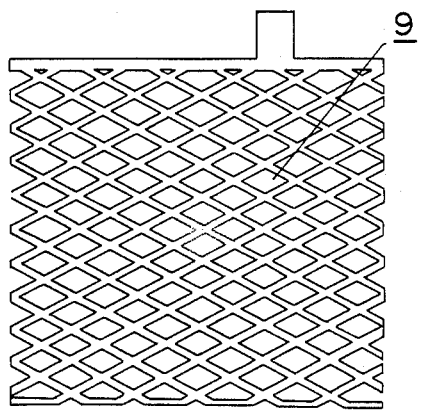
FIG. 4 is a top view of the grid cut out from the expanded sheet.
Figure 5:
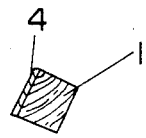
FIG. 5 is an enlarged sectional view of the skeletal part of the grid.

Then, each of the sheets was subject to an expanding processin the usual way to obtain a product shown in FIG. 3 where the central area 7 was left unexpanded and the left and right areas were expanded into diamond-shaped networks 8, after which the product was cut into predetermined size and shape to obtain a grid 9 shown in FIG. 4. As shown in the enlarged view of FIG. 5, the section of skeletal part of this grid 9 was so constructed that a thin layer of lead-tin alloy 4 was pressure-bonded onto one side of lead-calcium-tin alloy layer 1. The lead-tin layer 4 was inclined toward the inner side of grid mesh due to the twisting force arising at the time of expanding processing.

This expanded grid was used as a positive electrode, and a pasty active material was filled thereinto in the usual way. Thus, three lots of automobile lead acid batteries A, B and C were obtained. Further, for comparison, a usual battery D was also prepared by repeating the above-mentioned procedure except that the pressure-bonding treatment using lead-tin alloy sheet was not carried out. All these batteries had a form of 12V-55D23.

Figure 6:
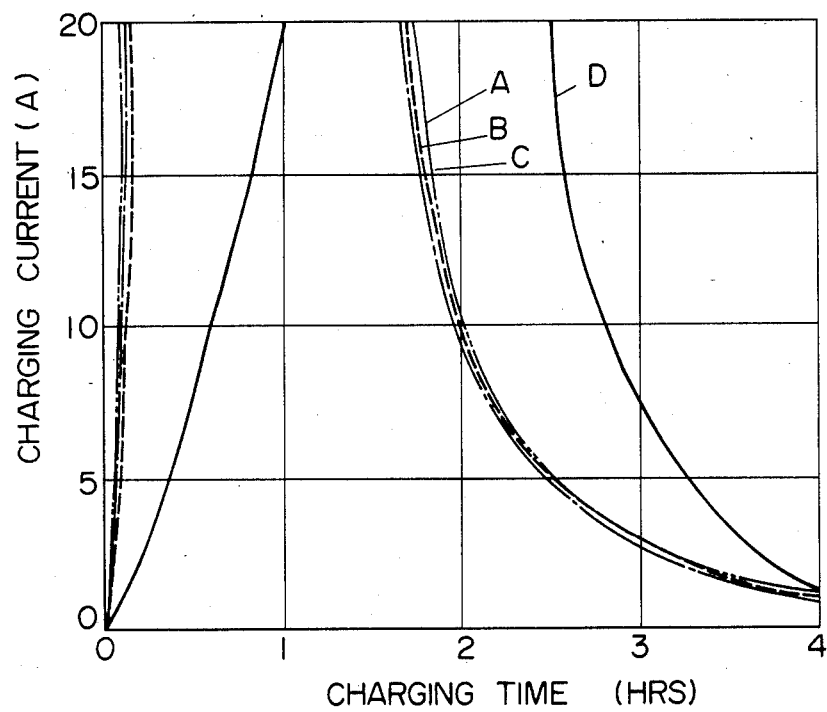
FIG. 6 is a graph illustrating the charging characteristics of an acid battery using the grid of the invention which has been left standing in a superdischarged state.

The batteries A-D were connected to a 12Ω resistor and left standing for one week, after which they were left standing in open circuit for one week. Thereafter, they were charged at a constant voltage of 15 V, and the change in current was followed. As the result, the comparative sample D necessitated one hour until it had reached the maximum current, while the samples using the grid of the invention reached the maximum current in only 5 minutes, demonstrating that the recovery characteristics after standing in super-discharged state was improved. FIG. 6 illustrates one of the results.

In the example presented above, only one surface of sheet bar made of lead-calcium-tin alloy was subjected to cladding treatment using a lead-tin alloy sheet by cold rolling. Apart from such an embodiment, it is also possible, of the course, to subject both surfaces of sheet bar to a cladding treatment using a sheet or a foil of lead-tin alloy.

If a grid is formed by an expanding processing of a sheet-formed elementary material prepared by integrating a sheet bar of lead-calcium-tin alloy with a lead-tin alloy sheet by cold rolling as has been mentioned above, the smallness of the tendency of self-discharge or the maintenance-free characteristics of the alloy sheet bar can be sufficiently utilized, and at the same time the formation of high-resistance passive state material at the interface between the grid and the pasty active material filled therein can also be prevented. As has been mentioned above, this can be achieved by enhancing the concentration (content) of tin in the surface layer of grid to 1.5% or more. The tin content in the sheet or foil of lead-tin alloy must be in the rane of 1.5% to 30%. With increasing content of tin, the cost of the sheet or foil rises. In addition, with increasing content of tin, the lead-tin alloy becomes softer, which disturbs the bonding to the sheet bar at the time of cold rolling. This can cause a decrease in capacity when such a grid is set into a lead acid battery.

By keeping the alloy sheet bar at a temperature of 130° C. to 180° C. at the time of cold rolling, the alloy can be prevented from recrystallization or the formation of coarse crystal particles of the alloy. Further, by adjusting the thickness of rolled lead-tin alloy sheet or foil to 0.7 mm or less and by carrying out the rolling to such an extent that thickness of the rolled sheet becomes 1/5 or less of the thickness before rolling, the bonding strength can be enhanced. Further, when the above-mentioned conditions are fulfilled, the rolled sheet exhibits a time-hardening effect if left standing for a necessary period of time after rolling, which enhances the tensile strength of the sheet.

As for the shape of grid, a diamond-shaped network produced by an expanding processing is desirable from the veiw point of material yield. However, a shape of a punched sheet produced by punching out many holes of predetermined shape from a sheet (punching processing) is also usable.

Next, as another example, there will be mentioned a case that a lead-antimony alloy having a smaller thickness than sheet bar and different in composition from sheet bar is roll-bonded onto a sheet bar of lead-calcium-tin alloy.

As the sheet bar, the same alloy as above composed of 0.07% calcium, 0.25% tin and a residual quantity of lead and having a thickness of 10 mm and a width of 80 mm was used. On the other hand, the lead-antinony alloy sheet was a ribbon-like sheet of lead-antinony alloy having a thickness of 0.3 mm and a width of 20 mm. The antimony content was 1.0% by weight.

Two lead-antimony alloy sheets were placed on the sheet bar in parallel with each other at an interval of 20 mm, and the whole was subjected to a cold rolling process in the same manner as above. The final sheet obtained by cold rolling had a lessened tendency of self-discharge storage owing to the characteristics of the sheet bar alloy itself and, in addition, it had an increased mechanical strength owing to the use of the lead antimony sheet. Further, it prevented the formation of paassive state material at the interface between the pasty active material and grid surface.

According to the study of the present inventors, it is preferable to adjust the antimony content in the lead-antimony alloy sheet to 0.5–5% by weight. If the antimony content is lower than 0.5%, the addition of antimony cannot bring about a sufficient increase in mechanical strength and a sufficient prevention of the formation of passive state material at the interface between grid and active material. If the antimony content is higher than 5%, the product becomes poor in ductility and malleability even though mechanical strength can be enhanced. Thus, the lead-antimony alloy cannot exhibit an elongation enough to follow that of sheet bar when it is subjected to an integrating treatment together with sheet bar by the rolling, and there occur cracks and insufficient bonding.

In yet another example, a sheet or a foil of lead-silver alloy is superposed on sheet bar and pressure-bonded by rolling.

The same sheet bar as above was used. As the lead-silver alloy sheet, a sheet having a thickness of 0.3 mm and containing 0.1% by weight of silver was used. The width of the sheet and the procedure for superposing it on sheet bar were the same as above, and the whole was subjected to rolling treatment.

The results were as follows. Due to the presence of silver, the lead-silver alloy sheet brought about good ductility and malleability, prevented the formation of passive state material at the interface between the sheet surface and active material and improved the corrosion resistance. Thus, in cooperaton with the ability of the sheet bar to prevent the self-discharge during storage, it can improve the chargeability after standing in a super-discharged state.

Preferably, the content of silver in the lead-silver alloy is 0.01–0.5%. If it is smaller than 0.01%, the resulting sheet cannot have sufficient corrosion resistance, ductility and malleability and the prevention of the formation of passive state material is insufficient. If the silver content is higher than 0.5%, the alloy is too high in cost. Further, such an alloy sheet has too high ductility and malleability even though corrosion resistance and preventive effect on the formation of passive state material are improved. Thus, when such a lead-silver sheet is integrated with the sheet bar by rolling, the sheet slips on the surface of sheet bar so that good pressure bonding can not be achieved.

As above, the present invention can easily provide a grid for lead acid batteries excellent in recovery characteristics after standing in a super-discharged state.

Additionally, according to the invention, the surface treatment necessary for improving the recovery characteristics can be applied to a limited necessary part, which enables the production of a lattice material without material loss.

What is claimed is:

1. A process for producing a grid for use in lead acid batteries which comprises superposing a sheet or a foil of a lead alloy on a sheet bar composed of a lead-calcium alloy containing 0.03 to 0.15% by weight of calcium, 0 to 1.5% by weight of tin and a residual quantity of lead, said sheet or foil of lead alloy having a tin concentration in the range of 1.5 to 30% by weight and a tin concentration which is larger than the tin concentration of said sheet bar, said sheet or foil also having a thickness thinner than that of said sheet bar, and no greater than 0.7 mm followed by integrating both materials by a cold rolling process at a temperature less than or equal to 180° C. to form an elementary sheet having a thckness which is at most 1/5 times the thickness of the sheet bar and the sheet or foil before rolling and then subjecting the elementary sheet to an expanding or punching processing to form a grid.

2. A process for producing a grid for use in lead acid batteries according to claim 1, wherein said sheet or foil of lead alloy to be superposed said sheet bar in a sheet or a foil of a lead-silver alloy containing 0.01% to 0.5% by weight of silver.

3. A process for producing a grid for use in lead acid batteries according to claim 1, wherein said lead-calcium alloy constituting the sheet bar is subjected to a preliminary heating at a temperature of 130° C. to 180° C. before it is introduced into a cold rolling mill.

4. A process for producing a grid for use in lead acid batteries which comprises superposing a sheet or a foil of a lead alloy on a sheet bar composed of a lead-calcium alloy, said sheet or foil of lead alloy having a composition different from that of the sheet bar and a tin concentration greater than that of said sheet bar, and having a thickness thinner than that of the sheet bar, and no greater than 0.7 mm followed by integrating the two materials by cold rolling process at a temperature less than or equal to 180° C. to form an elementary sheet of which the thickness after rolling is at most 1/5 times as large as the total thickness of the sheet bar and the sheet or foil before rolling, and then subjecting the elementary sheet to an expanding or punching processing to form a grid.

5. A process for producing a grid for use in lead acid batteries according to claim 4, wherein said lead-calcium alloy constituting the sheet bar is subjected to a preliminary heating at a temperature of 130° C. to 180° C. before it is subjected to said cold rolling process.

6. A process for producing a grid for use in lead acid batteries according to claim 4, wherein said cold rolling is carried out by the use of a rolling mill equipped with three or more stages of rolls in which the distance between paired rolls successively decreases from one stage to the next stage.

7. A process for producing a grid for use in lead acid batteries according to claim 4, wherein said sheet or foil of lead alloy to be superposed on the sheet bar is a lead-tin alloy containing 1.5% to 10% by weight of tin.

8. A process for producing a grid for use in lead acid batteries according to claim 4, wherein said sheet bar is made of an alloy composed of 0.07% by weight of calcium, 0.25% of tin and a residual quantity of lead and its thickness is at least three times as large as the thickness of the sheet or foil of lead alloy to be superposed thereon.

9. A process for producing a grid for use in lead acid batteries which comprises superposing a sheet or a foil of a lead-tin alloy having a thickness no greater than 0.7 mmm and containing about 5% by weight of tin on a sheet bar composed of about 0.07% by weight of quantity of lead, followed by integrating the two materials by a cold rolling process at a temperature less than or equal to 180° C. to form an elementary sheet of which the thickness after rolling is at most 1/5 times as large as the total thickness of the sheet bar and the sheet or foil before rolling, and then subjecting the elementary sheet to an expanding processing to form a grid.

10. A process for producing a grid for use in lead acid batteries according to claim 9, wherein said lead-calcium alloy constituting the sheet bar is subjected to a preliminary heating at a temperature of 130° C. tol 180° C. before it is introduced into a cold rolling mill.

* * * * *

UNITED STATES PATENT AND TRADEMARK OFFICE
CERTIFICATE OF CORRECTION

PATENT NO.  :  4,805,277
DATED       :  February 21, 1989
INVENTOR(S) :  Hiroshi YASUDA et al It is certified that error appears in the above-identified patent and that said Letters Patent is hereby corrected as shown below:

In the heading of the patent, change

[21]  Appl. No.: "671,354"    to

[21]  Appl. No.: -- 135,485 --.

Signed and Sealed this

Thirtieth Day of April, 1991

Attest:

HARRY F. MANBECK, JR.

*Attesting Officer*          *Commissioner of Patents and Trademarks*